United States Patent [19]

Tuttle

[11] 4,078,165
[45] Mar. 7, 1978

[54] SEMI-AUTOMATIC FEED LASER APPARATUS

[75] Inventor: William D. Tuttle, Farmingdale, N.Y.

[73] Assignee: Grumman Aerospace Corporation, Bethpage, N.Y.

[21] Appl. No.: 682,501

[22] Filed: May 3, 1976

[51] Int. Cl.² ............................................. B23K 9/00
[52] U.S. Cl. ..................... 219/121 L; 219/121 LM
[58] Field of Search ............ 219/121 L, 121 LM, 159, 219/198, 269

[56] References Cited

U.S. PATENT DOCUMENTS

| | | | |
|---|---|---|---|
| 3,453,097 | 7/1969 | Häfner | 219/121 LM |
| 3,469,076 | 9/1969 | Saslawsky | 219/121 L |
| 3,866,398 | 2/1975 | Vernon et al. | 219/121 L |
| 3,909,582 | 9/1975 | Bowen | 219/121 LM |

OTHER PUBLICATIONS

Electronic Packaging & Production, Kiver, Mar., 1971, pp. 22-24, 26, 28, 30 & 32.

*Primary Examiner*—J. V. Truhe
*Assistant Examiner*—Fred E. Bell
*Attorney, Agent, or Firm*—Morgan, Finnegan, Pine, Foley & Lee

[57] ABSTRACT

A semi-automatic feed laser apparatus includes a laser beam focused on a workpiece affixed to a pattern template which is urged by the operator against rotatable guide means rotating at a predetermined rate to feed the workpiece smoothly under the laser yet permit manual override of the feeding operation to accommodate irregularities or surface non-uniformities in the workpiece. Advantageously, the guide means include a hollow cylinder-like member and drive means operably connected thereto for rotating the guide cylinder. As preferably embodied, one end of the guide cylinder is adapted to contact the template while its other end is coupled to an exhaust system for removing debris and combustion particles immediately from the work area. Moreover, the axis of the cylinder may be generally aligned with the laser beam to allow harmless defocusing of the laser radiation. According to another aspect of the invention, cooling means surrounds the guide for cooling the wall of the guide to prevent the plating or build-up of molten debris. Alternatively, the cylinder axis may be slightly askew of the laser beam to enable cooling means to be positioned immediately under the workpiece for cooling debris generated during the cutting operation.

23 Claims. 3 Drawing Figures

SEMI-AUTOMATIC FEED LASER APPARATUS

BACKGROUND AND OBJECTS OF THE INVENTION

The present invention relates generally to laser cutting apparatus, and more particularly to improvements in manual feed laser cutting apparatus.

Recently, devices which generate laser radiation have been adapted for an increasing number of applications, such as range measuring devices, welding devices, etc. Among the many industrial applications for lasers, the utilization of focused laser radiation is particularly well suited for drilling, scoring or cutting metals as well as such non-metals as cloth, wood, plastics, etc. These laser cutting devices offer high quality and high speed cutting capabilities. However, completely hand fed laser cutting devices do not provide the high quality cuts or scorings that lasers are capable of producing.

Thus, heretofore, in order to optimize the quality of the cut in the workpiece, typical laser drilling/cutting apparatus include moving worktables positioned under the laser. Some, as disclosed in U.S. Pat. No. 3,736,402 issued to Mefferd et al., also include numerical programming equipment for guiding the worktable (and the workpiece mounted thereon) to perform the cutting operation in a totally automatic manner. Although such devices are satisfactory for many applications, these apparatus are necessarily expensive and generally occupy substantial floor space. In addition, it is difficult, if not impossible, to utilize these devices for cutting pre-formed or curved workpieces, such as aircraft structural skin and the like.

Also heretofore, it has been known that, in order to prevent smoke, debris and other products of combustion from scattering or rising to deposit on the lens system, a stream of gas may be directed at the region where the laser strikes the workpiece whereby such particles cannot interfere with transmission of the laser or reduce its efficiency. However, in order to remove these particles fully from the area of the workpiece, the presence of the worktable may cause the particles to be scattered radially outwardly, generally in the plane of the worktable, risking injury to the operator. To avoid this, additional exhaust equipment has been positioned adjacent the region of laser incidence, such as disclosed in U.S. Pat. No. 3,742,183 issued to Castro et al., making the device more expensive as well as awkward to operate. In addition, such exhaust devices are not capable of completely reducing the scattering of debris.

In general, although the hereinbefore described prior art devices have provided good results for many applications, they are relatively complex, requiring substantial financial investment and occupying substantial floor space, and often necessitate skilled craftsmen for operation. Such factors prohibit machinists with limited capital or factory space as well as those working on small or pre-formed or curved workpieces from enjoying the advantages of laser cutting. In addition, the less sophisticated laser devices which are completely manually operated, and therefore dependent upon the operators skill for successful operation, do not provide the reliable and quality results of the more sophisticated devices.

It is therefore an object of the present invention to provide new and improved laser cutting apparatus.

Another object of the present invention is to provide new and improved laser cutting apparatus which is relatively inexpensive and easy to operate.

It is another object of the present invention to provide new and improved laser cutting apparatus capable of generally automatic workpiece feeding yet allowing manual override to accommodate irregularities or non-uniformities in the workpiece.

It is also an object of the present invention to provide new and improved laser cutting apparatus which requires little ancillary equipment and occupies relatively little floor space.

It is an additional object of the present invention to provide new and improved laser cutting apparatus capable of substantially complete removal of smoke and debris with substantially no scattering thereof or operator injury therefrom.

It is a further object of the present invention to provide new and improved laser cutting apparatus capable of operating on curved or pre-formed workpieces as well as reliable repeatability of the resultant product.

It is yet another object of the present invention to provide new and improved laser cutting apparatus offering minimal clearance to prevent inadvertent operator injury.

It is still a further object of the present invention to provide new and improved laser cutting apparatus permitting the use of low cost shop-made templates and toolings.

Objects and advantages of the invention are set forth in part herein and in part will be appreciated herefrom, or may be learned by practice with the invention, the same being realized and attained by means of the instrumentalities and combinations pointed out in the appended claims. Accordingly, the invention resides in the novel parts, constructions, arrangements, combinations and improvements herein shown and described.

SUMMARY OF THE INVENTION

Briefly described, laser cutting apparatus according to the present invention comprises a generally hollow guide structure rotatably supported under a focusable, gas-assisted, source of laser radiation, with drive means operably coupled to said guide for rotating it at a predetermined rate to provide generally automatic feed of workpiece mounted to a template when the template bears against the guide yet allow manual override to accommodate irregularities in the workpiece. Advantageously, the rotatable guide structure is adapted to be coupled to an exhaust device providing suction or other vacuum effect to withdraw substantially all smoke, oxides and other discharge particles and debris resulting from the burning/cutting operation immediately from the work area. In addition, as preferably embodied, cooling means are provided under the work area for cooling guide structure and/or the "stream" of oxides and other such debris as it leaves the work area to substantially prevent any build-up or plating of such debris within the guide structure.

Advantageously, and as here preferably embodied, the rotatable guide includes a step-like cylinder-cone-cylinder member rotatably mounted to a support member having a generally hollow central passage adapted to transmit the suction force of the exhaust system to the workpiece-supporting/template-engaging end of the guide, which end is preferably provided with a friction rim. Also advantageously, the cooling means may comprise an essentially water-tight water jacket formed in the aforesaid central passage, adapted to be supplied with a substantially constant flow of water or other coolant, preferably directed near the top of said water jacket.

In another preferred embodiment of the invention, the rotatable guide includes an essentially cylindrical member rotatably mounted to a support member and coupled at its lower end to the exhaust system. Advantageously, the cooling means may comprise a generally porous torroidal ring coupled to a source of water or other coolant, positioned substantially at the workpiece-supporting/template-engaging end of the cylindrical member, which end is preferably provided with a friction rim.

Also advantageously, laser cutting apparatus according to the invention may include height sensing means maintained substantially in contact with the upper surface of the workpiece and coupled to adjustment means for adjusting the position of the laser focusing means and maintaining the laser radiation substantially focused on the workpiece. As preferably embodied, the height sensing means is essentially electro-mechanical and includes a shoe member maintained in contact with the workpiece surface in substantially close proximity to the region of laser incidence on the workpiece. The shoe member is mechanically coupled to a ferromagnetic slug slidably retained within a linear variable displacement transformer such that movements of the shoe member may be transmitted thereto for generating a suitable current which activates the adjustment means to re-position the laser focusing assembly.

It will be apparent from the foregoing general description that the objects of the invention specifically enumerated herein are accomplished by the invention as here embodied.

Accordingly, it has been found that by providing rotating guide means on laser cutting apparatus, for use in conjunction with a template mounted to the workpiece, a semi-automatic feeding mechanism is established, providing substantially constant feeding of the workpiece yet allowing manual over-ride to maintain an essentially instantaneous control on the quality of the cutting operation for accommodating non-uniformities in the workpiece, thereby ensuring high quality cutting.

It has also been found that by forming the guide means as a generally hollow member coupled to exhaust means, the laser cutting apparatus according to the present invention is capable of both the aforesaid semi-automatic feeding as well as substantially complete removal of debris, since the entrance to the evacuation system is effectively positioned as close as possible to the point of laser incidence on the workpiece to withdraw smoke, oxides and other debris immediately of the area of laser incidence for substantially complete removal thereof. In addition, by utilizing rotatable guide means with a generally cylindrical workpiece-supporting/template-engaging end structure, it has been found that curved or pre-formed workpieces may be easily accommodated, thus enabling the high quality cutting of lasers to be applied to such structures. Furthermore, the hollow guide means are particularly advantageous in providing "expansion" space under the laser to allow the laser to defocus and its energy dissipate after it has penetrated the workpiece to avoid damaging other equipment or structures. Furthermore, by providing cooling means immediately adjacent the workpiece-supporting/template engaging end of the guide, the evacuation system will remain substantially unclogged, since molten materials will not "plate" or adhere to its inner walls.

It has also been found that by providing a shoe member which substantially surrounds the nozzle of the laser enclosure assembly, height sensing means are provided which are substantially sensitive to variations in the surface of the workpiece, as such areas are positioned directly under the laser. Furthermore, laser cutting apparatus embodying the foregoing features are substantially less complicated and less space-consuming than programmable laser cutting devices heretofore known, while providing workpiece cutting capability which is substantially comparable to that provided by such complex devices. Moreover, operation of laser cutting apparatus according to the present invention may be carried out by an operator of ordinary skill.

In addition, laser cutting apparatus embodying features of the present invention enable the known advantages of cutting sheet metal, etc., by laser to be incorporated in apparatus requiring low cost shop-made templates, and are both economical and safe to operate — much safer than conventional bandsaw cutting devices, without the operator fatigue normally experienced in bandsaw cutting.

It will be understood that the foregoing general description, as well as the following detailed description, are exemplary and explanatory of the invention but are not restrictive thereof. Accordingly, the accompanying drawings, referred to herein and constituting a part hereof, illustrate preferred embodiments of the present invention, and together with the description, serve to explain the principles of the invention.

DETAILED DESCRIPTION OF PREFERRED EMBODIMENT

Figure 1:
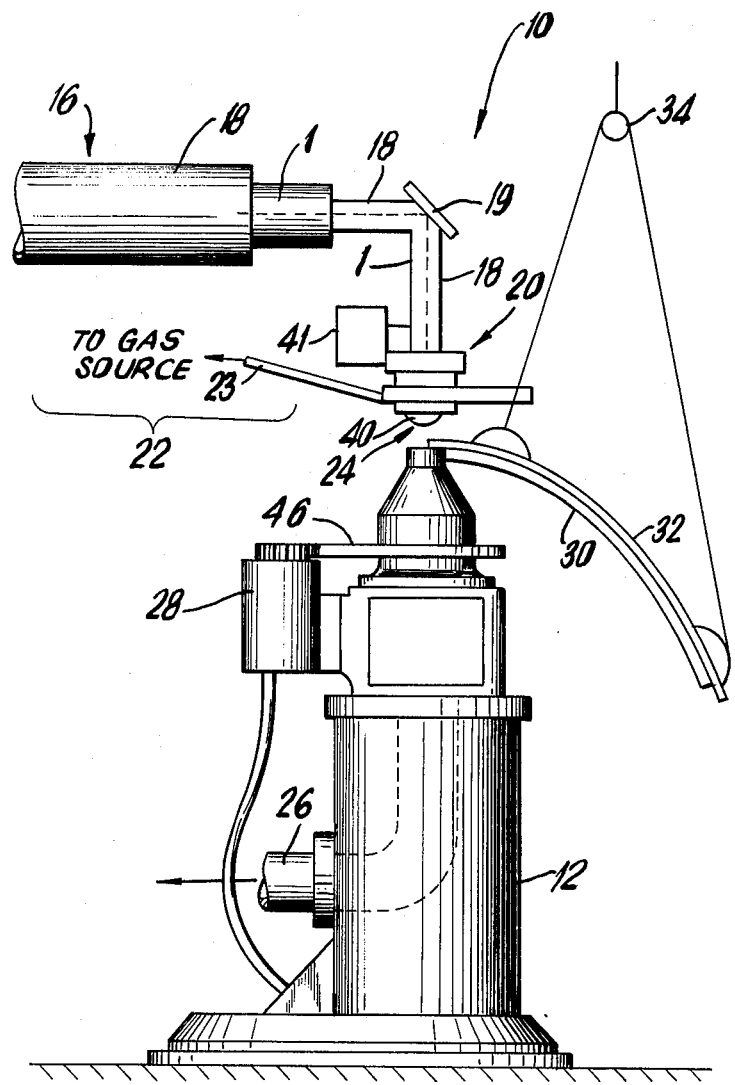
FIG. 1 is a side view of an illustrative embodiment of laser cutting apparatus according to the present invention.

Referring now to the embodiments shown in the accompanying drawings, wherein like reference numerals refer to like parts, there is illustrated in FIG. 1 one embodiment of laser cutting apparatus, indicated generally by reference numeral 10, according to the present invention.

In accordance with the invention, laser cutting apparatus 10 includes laser generating source 16 surrounded by protective casing 18. In general, although laser source 16 may be any conventional device for generating laser radiation (illustrated as laser "beam" 1), a 250 watt, continuous wave, $CO_2$ laser has proved satisfactory for generating sufficient energy for developing local incandescence, melting and rapid oxidation of typical workpiece materials, such as titanium, steel and low nickel/steel alloys, plastics, boron, etc.

Casing 18 surrounds laser source 16 and, where necessary, acts as a conduit with reflection means (indicated by reference number 19) for changing the path of the laser beam to direct it at a predetermined work area. In addition, casing 18 may support lens system 20 which is used for focusing the laser radiation at a predetermined point on the workpiece. A lens system 20 adapted to provide a focused laser "spot" of about 0.006 inches in diameter has been found particularly useful for the aforesaid applications. Moreover, laser enclosure 18 includes gas introduction system 22 including conduit 23 for introducing a preselected assist gas into the nozzle portion (indicated generally at 24 in FIG. 1) formed at the end of enclosure 18, for assisting laser apparatus 10 by, for example, blowing substantially all smoke, oxides and other debris generated during cutting away from the work area for preventing interference with either the optics of the laser system or the transmission of the laser radiation. In this context, the laser cutting apparatus according to the present invention includes exhaust or suction means — indicated generally by reference numeral 26 and discussed more fully hereinafter — for collecting and withdrawing substantially all such debris immediately from the cutting area to prevent scattering.

In addition, the assist gas may also be directed at the work spot for other purposes, such as, promoting rapid oxidation of the workpiece or providing inert shielding of the workpiece. Therefore, in selecting the assist gas, consideration should be given the heat of reaction of the combination of the assist gas and workpiece material as well as any other properties necessary to accommodate such other functions as the gas may be intended to perform. For example, when cutting titanium or steel, rapid oxidation will be desirable and may be achieved by including oxygen in the assist gas. However, when plastics such as acrylic are to be cut, the assist gas need only blow away the oxides and debris, and an inert gas such as nitrogen may be used.

According to the present invention, laser apparatus 10 includes rotatable guide member (indicated generally by reference number 14) rotatably mounted to support structure 12 with workpiece 32 (or spacer 31 shown in FIG. 2) supported on the end of guide 14 and template 30 (securely attached to workpiece 32) adapted to abut the edge of guide 14 adjacent that end. Thus, with workpiece 32 attached to template 30, appropriately set back from the desired laser cut path, template 32 may bear against guide 14 for a controlled feed of the workpiece into the work area under laser 1 (i.e. the laser radiation generated by laser source 16) yet permit manual override, as more fully described hereinafter. To this end, laser apparatus 10 includes drive means 28 for rotating guide 14 at a predetermined rate.

Advantageously, and as here preferably embodied, guide means 14 may comprise a hollow structure having a generally circular cross-section. Thus, according to the embodiment shown in both FIGS. 1 and 2, guide 14 comprises cylindrical upper portion 14a for engaging the workpiece and template, conical body section 14b for accommodating such structures as upper support structure 12a, and cylindrical base portion 14c for engaging endless belts, or drive chains, 46 coupling drive means 28 thereto. Accordingly, guide 14 is mounted via bearings 44 to support structure 12a and rotated by drive means 28 via endless belt 46. According to this aspect of the present invention, the upper end of guide means 14 is adapted for engaging template 30 in generally line contact (i.e. the straight outer wall of guide 14a mates with a straight edge of template 30). Furthermore, and as here preferably embodied, the other end of guide 14 may be adapted for connection to suction means 26. This aspect of the present invention is particularly useful since the exhaust suction is effectively developed at the workpiece-supporting/template-engaging end of guide 14, adjacent workpiece 32. Accordingly, the assist gas provided by source 22 may be directed essentially into the open top of guide 14 such that substantially all of the smoke, debris and other particles generated during the cutting operation may be evacuated immediately of the work area under the influence of exhaust means 26 with essentially no scattering of such debris, offering substantially no risk of operator injury from flying sparks, etc., since substantially all will emanate from the bottom of the workpiece and be collected immediately by the evacuation system.

Also advantageously, guide 14 is positioned under laser 1 with its central axis generally aligned with the laser path to provide "expansion" room so that the laser may defocus and dissipate its energy harmlessly.

In operation, workpiece 32 which is attached to template 30 — but may include spacer 31 therebetween to provide additional clearance for the dross generated on underside of workpiece — is positioned by the operator either manually or with the assistance of a pulley or sling (indicated generally at 34) into the cutting zone of laser apparatus 10. The bottom of spacer 31 (or workpiece 32 if no spacer is used) is rested on top of guide 14 and template 30 is urged in contact with the side wall of guide means 14. The friction generated between template 30 and guide 14, as the former is urged to bear against the latter, provides smooth feeding or workpiece 32 under laser 1, which is capable of manual override when desired. This aspect of the present invention is particularly useful for obviating the necessity of relying upon the skill of the operator to provide the proper feed rate for producing a clean cut, yet, enabling the operator to manually adjust the feed rate to compensate for any non-uniformities or irregularities in the workpiece. Thus, where completely manual feeding of the workpiece may result in a poor quality cut (too slow or haltingly) or incomplete penetration (too fast), the present invention overcomes such disadvantages by providing semi-automatic feed means whereby the operator can "feel" the feed rate and maintain a steady movement of the workpiece under the laser to facilitate and ensure a consistently clean, high quality cut.

According to another aspect of the invention, enclosure assembly 18 may also be provided with height sensing means (indicated generally at 40) which is maintained in contact with the upper surface of workpiece 32 in order to detect irregularities in such surface, as hereinafter described. Accordingly, the positioning of enclosure assembly 18, and therefore of the focused point of the laser, is substantially instantaneously adjusted to accommodate the irregularities in the workpiece surface, or its thickness.

Figure 2:
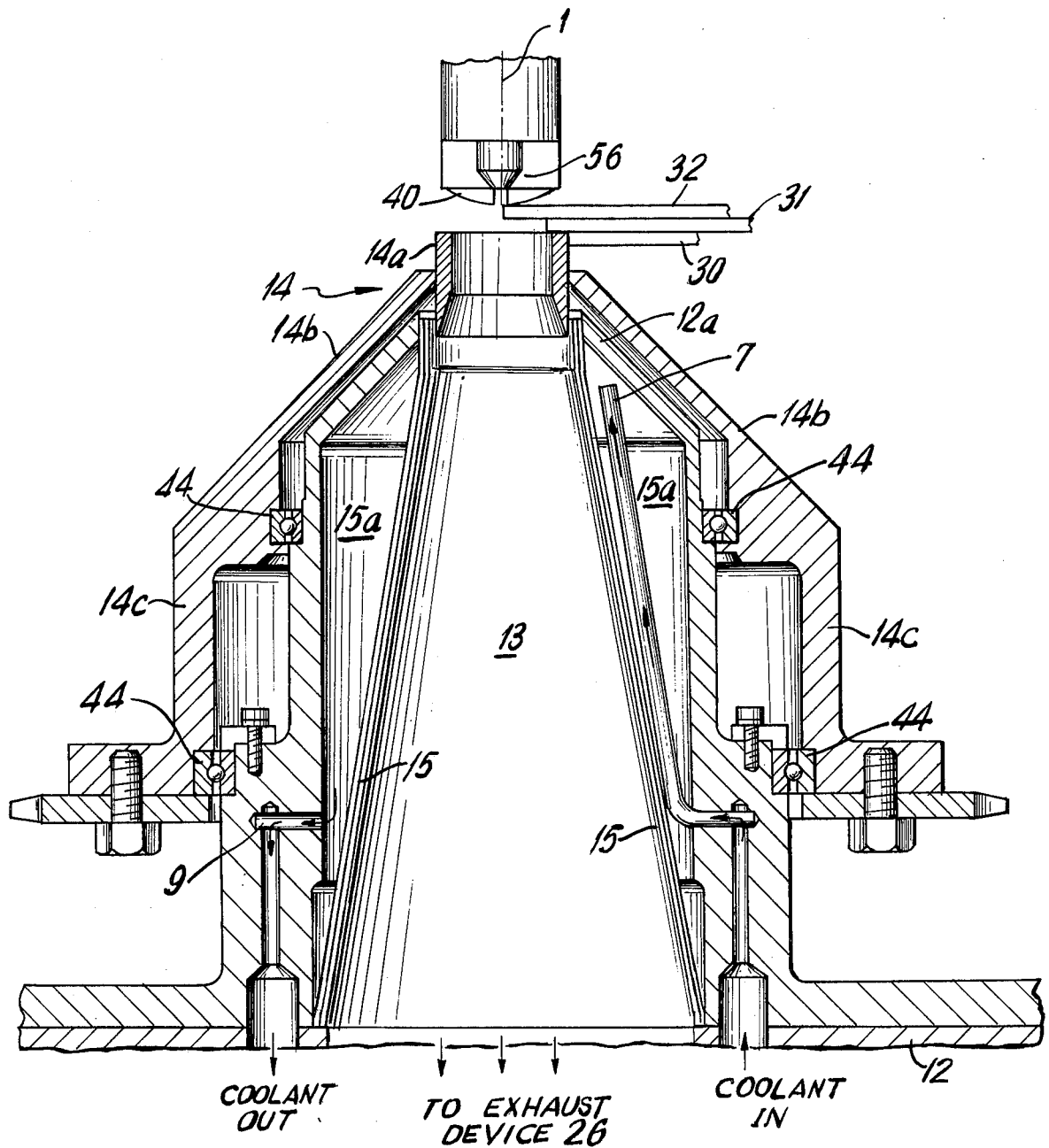
FIG. 2 is an enlarged sectional view of guide means and work area according to the embodiment shown in FIG. 1.

Referring now more specifically to FIG. 2 there is shown a particularly useful aspect of the invention. According to this aspect, support member 12 and upper support member 12a are formed with passage 13 extending therethrough, generally central thereof. The lower end of passage 13 is coupled to evacuation system 26, as hereinbefore described. In addition, cooling means are preferably provided substantially at or near the workpiece-supporting/template-engaging end of guide 14 in order to maintain the upper portion of passage 13, especially that immediately adjacent the cutting area, at a substantially low temperature relative to that of the molten workpiece and/or the debris generated during cutting such that substantially none of the stream of such debris plates or adheres to the inner walls of passage 13, which would otherwise reduce, or eliminate, the available diameter of passage 13. To this end, passage 13 is provided with substantially water-tight water jacket 15 adapted to contain water, or another suitable coolant within coolant chamber 15a. Moreover, the cooling means advantageously also includes coolant introduction means here in the form of conduit 7, coupled to a suitable source of coolant (not shown) for introducing the coolant into cooling chamber 15a, and coolant exit means, here in the form of passage 9, for withdrawing coolant from chamber 15a such that a substantially constant quantity of coolant is maintained within chamber 15a, with a generally constant flow of coolant therethrough. As preferably embodied, conduit 7 opens as close to the upper edge of passage 13 as possible in order to maintain that portion, which has the tendency to become the hottest under the influence of the stream of debris, as cool as possible and substantially prevent any plating or buildup of such debris.

Figure 3:
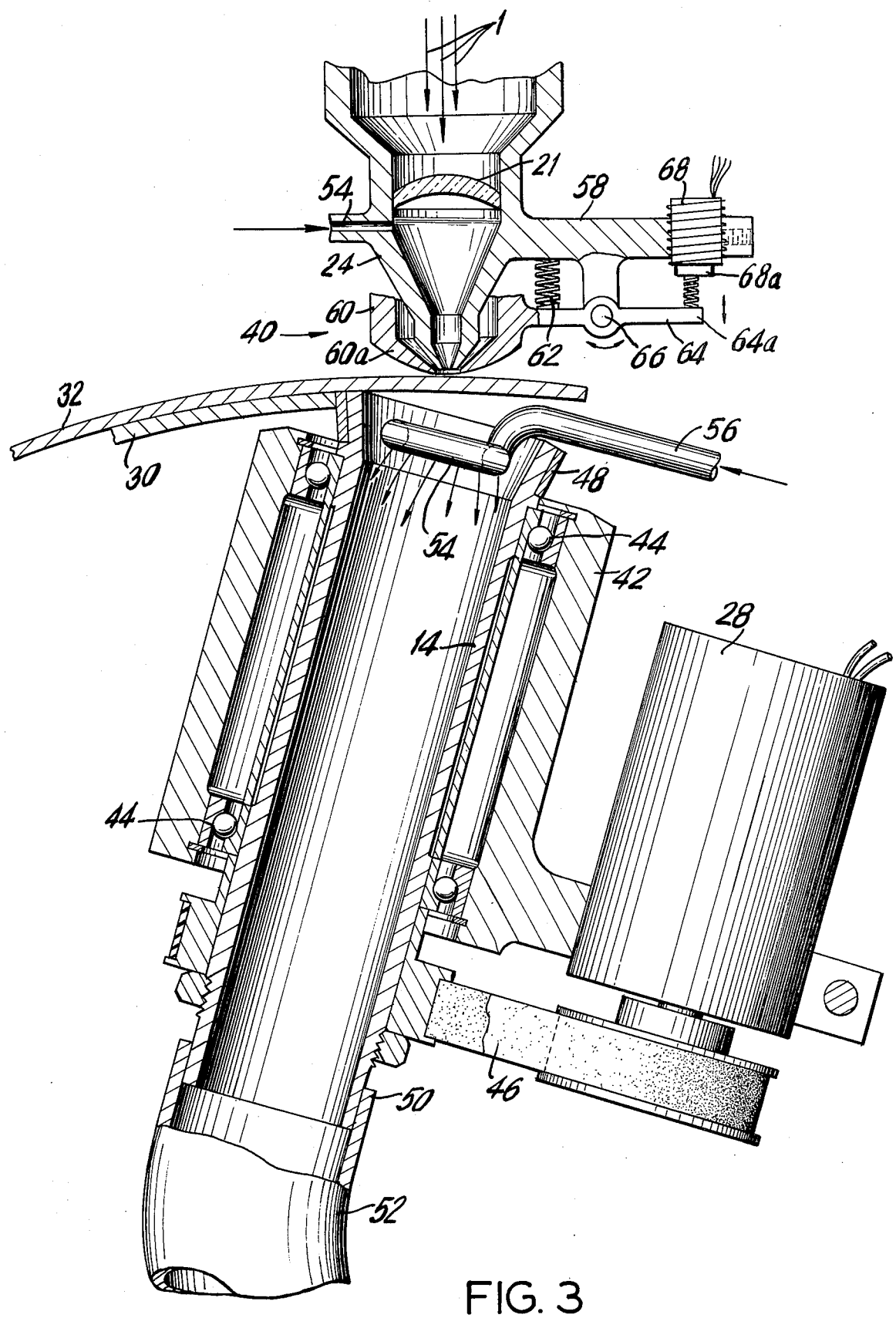
FIG. 3 is a section view of another embodiment of laser cutting apparatus according to the present invention.

Referring now to FIG. 3, there is shown a sectional view of another embodiment of laser cutting apparatus 10 according to the invention. According to this embodiment, guide 14 comprises a generally cylindrical member rotatably mounted within housing 42, as by bearings 44, and coupled to drive motor 28 by any convenient means, such as by endless belt 46. Advantageously, the workpiece-supporting/template-engaging end of guide 14 includes reinforced friction rim 48 against which template 30 may abut, in order to resist frictional wear of that end for insuring reliable repeatability of the pattern. The other end of guide 14 is advantageously coupled by a slip fit (indicated at 50) to an exhaust tube, or other suitable conduit, 52 leading to exhaust system 26.

Also advantageously, and as here preferably embodied, guide 14 may be oriented with its central axis slightly askew of, or forming a relatively small angle with, the path of laser beam 1, to allow positioning of porous cooling ring or torroid 54, having conduit 56 leading to a suitable reservoir of liquid coolant, just under the workpiece. Accordingly, a spray of coolant may be directed downwardly for cooling both the debris generated during the cutting and the inner walls of cylinder 14, to prevent the plating or build-up of molten debris on the inner walls of cylinder 14. This orientation also provides clearance for the "dross" formed on the underside of the workpiece and thereby obviates the necessity for spacers 31. However, it still provides the aforementioned "expansion" room for allowing harmless defocusing of the laser beam.

According to another aspect of the present invention, height sensing means 40, illustrated in FIG. 3, may be included with the laser cutting apparatus for maintaining the laser beam optimally focused on the workpiece despite any irregularities therein. Advantageously, height sensing means 40 includes shoe member 60 pivotally mounted to laser enclosure 18, and formed with "feeler" extensions 60a provided on at least two generally opposed sides of nozzle 24 for contacting the surface of workpiece 32 so as to maintain its contact with the surface and move in response to irregularities in the surface or non-uniformities in the thickness of workpiece 32. Displacements imparted to sensor 60 are translated to electrical energization means 68 which activate adjustment means (indicated by reference number 41 in FIG. 1) for re-positioning laser enclosure assembly 18 in order that the laser remains substantially focused on the surface of workpiece 32. As preferably embodied, shoe 60 may comprise an essentially tapered cup-shaped structure surrounding nozzle 24 with the circular opening defined by the edges of extension 60a being substantially close to the area of incidence of focused laser 1 on workpiece 32. Shoe 60 may also include an arm portion 64 essentially parallel to arm 58 which may be formed on nozzle 24, and pivotally connected thereto by pivot 66 with biasing means 62 (here shown as a spring) positioned therebetween for maintaining shoe 60 in contact with the surface of workpiece 32, such that shoe 60 is particularly sensitive to irregularities in the workpiece.

Advantageously, current generator means 68 may comprise a linear variable displacement transformer mounted to arm 58 and having a slug or core 68a slidably mounted therein. The transformer has a constant AC potential applied across its primary windings and is mechanically coupled to free end 64a of arm 64 for translating the displacements of shoe 60 to the slug 68a which is slidable within transformer 68. Thus, when shoe 60 moves in response to an irregularity on the surface of the workpiece, slug 68a is moved a proportionate distance in the opposite direction and changes the mutual induction between the primary and secondary windings of transformer 68 which energizes the adjustment means to accommodate such displacements and re-position laser enclosure assembly 18 to maintain the laser focused onto the surface of workpiece 32. A stepper motor has been found particularly useful as an adjustment means.

It will be understood by those skilled in the art that the embodiments shown and described herein are illustrative of the present invention and that, therefore, the invention in its broader aspects is not limited to these specific embodiments. Accordingly, variations may be made therefrom without departing from the scope and spirit of the invention as defined in the appended claims.

What is claimed is:

1. Gas assisted laser generating apparatus for cutting and scoring a workpiece mounted to a template, with spacer means therebetween when desired, comprising:
    a gas assisted laser source;
    means for substantially focusing laser radiation generated by said source at a predetermined point;
    a generally hollow guide structure adapted for rotatable mounting to a suitable support member, with its longitudinal axis generally aligned with the focused laser radiation, said guide having an upper end adapted to partially support said workpiece/template assembly and to frictionally engage an edge of said template for defining the desired pattern;
    a support member for supporting said guide, said support member including means for enabling rotation of said guide with respect to said support member;
    drive means mounted to a suitable support, operably coupled to said guide for providing rotational drive to said guide to rotate said guide with respect to said support member, such that when said workpiece/template assembly is positioned with said pattern edge of said template in frictional engagement with said upper end of said guide, said workpiece is generally automatically fed under said focused laser radiation while said generally automatic feed can be manually overridden when desired, and such that laser radiation penetrating said workpiece can defocus within said guide.

2. Apparatus according to claim 1 further including exhaust means for collecting and removing substantially all smoke, oxides and other debris generated during operation to prevent scattering thereof.

3. Apparatus according to claim 1, wherein the other end of said guide is adapted for coupling to evacuation means adapted to provide suction where it is coupled to said other end such that a substantial suction force is effectively developed at said upper end of said guide for collecting and removing substantially all smoke, oxides and other debris generated during operation, immediately of the region of incidence on said laser on said workpiece to substantially prevent scattering thereof.

4. Apparatus according to claim 3, which further includes cooling means positioned at least generally near said upper end of said guide to maintain the temperature of structural members collecting the flow of said smoke, oxides and other debris at a substantially lower magnitude than that of said smoke, oxides and other debris, to substantially prevent any build-up which could impede said flow.

5. Apparatus according to claim 1 which further includes height sensing means generally in contact with the top surface of the workpiece for substantially maintaining said focused laser radiation an essentially fixed distance from the surface of said workpiece.

6. Apparatus according to claim 5, wherein said height sensing means is an electro-mechanical height sensor comprising:
a generally heat-resistant shoe member adapted for contacting the top surface or said workpiece, said shoe member including contacting means provided on at least two generally opposed sides of said nozzle in contact with said workpiece;
biasing means for urging said shoe in contact with the top surface of said workpiece to maintain said shoe in contact with said top surface;
adjustment means operably coupled to said beam enclosure assembly for adjusting the position of said beam enclosure assembly to move said beam enclosure assembly in response to non-uniformities in said workpiece;
transformer means operably coupled to said adjustment means for controlling the operation of said adjustment means, said transformer means also being coupled to said shoe member for responding to linear displacements of said shoe member such that when shoe member moves away from said beam enclosure assembly, the linear displacement of said movement is directly translated to said transformer means for changing the output voltage thereof to energize said adjustment means for re-positioning said beam enclosure assembly closer to said top surface of said workpiece for maintaining said focused laser beam thereon, and when said shoe member moves closer to said beam enclosure assembly, the linear displacement of said movement is directly translated to said transformer means for changing the output voltage thereof to energize said adjustment means for re-positioning said beam enclosure assembly closer to said top surface of said workpiece for maintaining said focused laser beam thereon.

7. Apparatus according to claim 6, wherein said contacting means of said shoe member substantially surround said nozzle, said beam enclosure assembly includes a first arm member supporting said transformer means, and said shoe member includes a second arm member adapted for generally spaced pivotal mounting to said first arm member with biasing means positioned therebetween for urging said contacting means in contact with the top surface of said workpiece, said first and second arm members being positioned with respect to each other such that said linear displacements of said shoe member are translated to said transformer means.

8. Apparatus according to claim 7, wherein said first and second arms are essentially parallel and wherein said transformer means comprises a linear variable displacement transformer having a ferromagnetic slug slidable therein, said slug being coupled to said second arm member such that said linear displacements of said shoe member are transmitted to said slug for generally linear movement thereof, corresponding to said linear displacements, for varying the output of said transformer thereby controlling said stepper motor means for re-positioning said beam enclosure assembly.

9. Apparatus according to claim 8, wherein said adjustment means is a stepper motor.

10. Apparatus according to claim 1 which further includes cooling means positioned below the workpiece/template assembly and wherein said guide means is essentially cylindrical and rotatably mounted with its central axis slightly askew of said focused laser beam to accommodate positioning of said cooling means below said workpiece, such that said defocusing laser radiation and said debris and other discharge particles are subjected to the cooling influence of said cooling means to reduce their potential for causing damage.

11. Apparatus according to claim 10, wherein said cooling means includes a porous torroid coupled to a source of fluid coolant.

12. Apparatus according to claim 11 which further includes height sensing means generally in contact with the top surface of the workpiece for substantially maintaining said focused laser radiation an essentially fixed distance from the surface of said workpiece.

13. Apparatus according to claim 11, wherein said height sensing means is an electro-mechanical height sensor comprising:
a generally heat-resistant shoe member adapted for contacting the top surface of said workpiece, said shoe member including contacting means provided on at least two generally opposed sides of said nozzle in contact with said workpiece;
biasing means for urging said shoe in contact with the top surface of said workpiece to maintain said shoe in contact with said top surface;
adjustment means operably coupled to said beam enclosure assembly for adjusting the position of said beam enclosure assembly to move said beam enclosure assembly in response to non-uniformities in said workpiece;
transformer means operably coupled to said adjustment means for controlling the operation of said motor means, said transformer means also being coupled to said shoe member for responding to linear displacements of said shoe member such that when shoe member moves away from said beam enclosure assembly, the linear displacement of said movement is directly translated to said transformer means for changing the output voltage thereof to energize said adjustment means for re-positioning said beam enclosure assembly closer to said top surface of said workpiece for maintaining said focused laser beam thereon, and when said shoe member moves closer to said beam enclosure assembly, the linear displacement of said movement is directly translated to said transformer means for changing the output voltage thereof to energize said adjustment means for re-positioning said beam enclosure assembly closer to said top surface of said workpiece for maintaining said focused laser beam thereon.

14. Apparatus according to claim 12, wherein said contacting means of said shoe member substantially surround said nozzle, said beam enclosure assembly includes a first arm member supporting said transformer means, and said shoe member includes a second arm member adapted for generally spaced pivotal mounting to said first arm member with biasing means positioned therebetween for urging said contacting means in contact with the top surface of said workpiece, said first and second arm members being positioned with respect to each other such that said linear displacements of said shoe member are translated to said transformer means.

15. Apparatus according to claim 13, wherein said first and second arms are essentially parallel and wherein said transformer means comprises a linear variable displacement transformer having a ferromagnetic slug slidable therein, said slug being coupled to said second arm member such that said linear displacements of said shoe member are transmitted to said slug for generally linear movement thereof, corresponding to said linear displacements, for varying the output of said transformer thereby controlling said stepper motor means for re-positioning said beam enclosure assembly.

16. Apparatus according to claim 14, wherein said adjustment means is a stepper motor.

17. Apparatus according to claim 2 wherein said support structure is generally hollow and connected to said exhaust means, and wherein said guide means comprises:
- an essentially cylindrical first section generally near said point of incidence, adapted for contacting said workpiece/template assembly and having its central axis aligned with said laser beam;
- a generally conical second section flaring generally outwardly and over said base portion;
- a generally conical third section extending over a portion of said laser, adapted for operable connection to said drive means; and
- bearing means for accommodating rotational movement between said guide means and said base to enable said guide means to rotate with respect to said base when subjected to the rotational drive of said drive means, such that an exhaust vacuum is generated at the end of said first section nearest said workpiece for evacuating said smoke, debris and other particles immediately of said area of incidence.

18. Apparatus according to claim 17 which further includes height sensing means generally in contact with the top surface of the workpiece for substantially maintaining said focused laser radiation an essentially fixed distance from the surface of said workpiece.

19. Apparatus according to claim 18, wherein said height sensing means is an electro-mechanical height sensor comprising:
- a generally heat-resistant shoe member adapted for contacting the top surface of said workpiece, said shoe member including contacting means provided on at least two generally opposed sides of said nozzle in contact with said workpiece;
- biasing means for urging said shoe in contact with the top surface of said workpiece to maintain said shoe in contact with said top surface;
- adjustment means operably coupled to said beam enclosure assembly for adjusting the position of said beam enclosure assembly to move said beam enclosure assembly in response to non-uniformities in said workpiece;
- transformer means operably coupled to said adjustment means for controlling the operation of said motor means, said transformer means also being coupled to said shoe member for responding to linear displacements of said shoe member such that when shoe member moves away from said beam enclosure assembly, the linear displacement of said movement is directly translated to said transformer means for changing the output voltage thereof to energize said adjustment means for repositioning said beam enclosure assembly closer to said top surface of said workpiece for maintaining said focused laser beam thereon, and when said shoe member moves closer to said beam enclosure assembly, the linear displacement of said movement is directly translated to said transformer means for changing the output voltage thereof to energize said adjustment means for re-positioning said beam enclosure assembly closer to said top surface of said workpiece for maintaining said focused laser beam thereon.

20. Apparatus according to claim 19, wherein said contacting means of said shoe member substantially surround said nozzle, said beam enclosure assembly includes a first arm member supporting said transformer means, and said shoe member includes a second arm member adapted for generally spaced pivotal mounting to said first arm member with biasing means positioned therebetween for urging said contacting means in contact with the top surface of said workpiece, said first and second arm members being positioned with respect to each other such that said linear displacements of said shoe member are translated to said transformer means.

21. Apparatus according to claim 20, wherein said first and second arms are essentially parallel and wherein said transformer means comprises a linear variable displacement transformer having a ferromagnetic slug slidable therein said slug being coupled to said second arm member such that said linear displacements of said shoe member are transmitted to said slug for generally linear movement thereof, corresponding to said linear displacements, for varying the output of said transformer thereby controlling said stepper motor means for re-positioning said beam enclosure assembly.

22. Apparatus according to claim 21, wherein said adjustment means is a stepper motor.

23. Apparatus according to claim 17 which further includes:
- a wall within said hollow support structure, said wall forming a substantially liquid-tight coolant jacket between said wall and said support structure and providing passage generally central of said support structure for channelling said smoke, oxides and other debris to said evacuation means;
- coolant introduction means coupled to a source of coolant for introducing said coolant.

* * * * *